(12) United States Patent
Venugopal et al.

(10) Patent No.: US 7,634,503 B2
(45) Date of Patent: Dec. 15, 2009

(54) METHOD AND SYSTEM FOR SELECTING ANSWERS IN ANSWER SET USING A CUSTOMIZABLE TABLE

(75) Inventors: Mahenthiran Venugopal, Namakkal (IN); James E. Hetzel, Oxford, MI (US); Mary G. Keagul, Lexington, MA (US); Sean Peter Carapella, Somerville, MA (US)

(73) Assignee: Amadeus S.A.S., Biot (FR)

( * ) Notice: Subject to any disclaimer, the term of this patent is extended or adjusted under 35 U.S.C. 154(b) by 68 days.

(21) Appl. No.: 11/387,703

(22) Filed: Mar. 24, 2006

(65) Prior Publication Data
US 2007/0118548 A1    May 24, 2007

(51) Int. Cl.
G06F 17/00 (2006.01)
(52) U.S. Cl. ............ 707/104.1; 707/101; 707/102; 707/103 R
(58) Field of Classification Search ........... 707/1–10, 707/100–104.1, 200–206
See application file for complete search history.

(56) References Cited

U.S. PATENT DOCUMENTS

| | | | |
|---|---|---|---|
| 6,307,572 B1 | 10/2001 | DeMarcken et al. | 345/763 |
| 6,806,891 B1 | 10/2004 | Manuel et al. | 345/763 |
| 2003/0046117 A1 | 3/2003 | Jaehn | |
| 2004/0078252 A1 | 4/2004 | Daughtrey | |
| 2004/0236616 A1 | 11/2004 | Daughtrey | 705/5 |
| 2006/0031184 A1* | 2/2006 | Periyaswamy et al. | 707/1 |

FOREIGN PATENT DOCUMENTS

| | | | |
|---|---|---|---|
| WO | WO 01/33408 A2 | 5/2001 | |
| WO | WO 01/33473 A2 | 5/2001 | |

OTHER PUBLICATIONS

PCT Search Report.
"Ajax: A New Approach to Web Applications," by J. J. Garrett, Feb. 18, 2005, XP00700931.

* cited by examiner

*Primary Examiner*—Isaac M Woo
(74) *Attorney, Agent, or Firm*—Steptoe & Johnson LLP

(57) ABSTRACT

A method for assisting a person in viewing results of a database query uses query parameters to obtain query results from a database. A user interface displays a table having a selector column. The selector column includes a plurality of rows, with each row representing a set of values for a parameter selectable by a user from a set of selectable parameters. The table also has a selector row that includes a plurality of columns. Each column represents a set of values for a parameter selectable by a user from a set of selectable parameters. Parameters relate to data of the database, and some are computed or derived from database fields. A parameter may be a measure of a degree to which a travel itinerary satisfies a company or managed travel bias. The table further includes selector cells, with each cell corresponding to a row and column. A user can select subsets of query results for display in an answer table by selecting a column, row, or cell of the selection table.

16 Claims, 12 Drawing Sheets

You are viewing 1 to 3 of 3 results

Vendor ⌐ 120

123

Legend: ☑ Level of Preference

┌─ 122

| 1418.70 USD | Public | | | | | Select |
|---|---|---|---|---|---|---|
| | Continental Airlines 8238 | 0 Connections | 4/24/2006 | 8:20 AM - 8:00 PM | Coach | e-ticket | 0h, 40m |
| New York (EWR) - London (LHR) Show options with this flight | | | | | | |
| London (LHR) - New York (EWR) Show options with this flight | Continental Airlines 8237 | 0 Connections | 4/28/2006 | 8:30 PM - 11:10 PM | Coach | e-ticket | 7h, 40m |

View details   Purchase conditions

| 1418.70 USD | Public | | | | | Select |
|---|---|---|---|---|---|---|
| New York (EWR) - London (LHR) Show options with this flight | Continental Airlines 8238 | 0 Connections | 4/24/2006 | 8:20 AM - 8:00 PM | Coach | e-ticket | 0h, 40m |
| London (LHR) - New York (EWR) Show options with this flight | Continental Airlines 8221 | 0 Connections | 4/28/2006 | 4:00 PM - 6:40 PM | Coach | e-ticket | 7h, 40m |

121

METHOD AND SYSTEM FOR SELECTING ANSWERS IN ANSWER SET USING A CUSTOMIZABLE TABLE

BACKGROUND OF THE INVENTION

1. Field of the Invention

The invention is described for assessing low fare search results in the travel industry.

2. Discussion of Background Information

To find data matching their needs in large amounts of data, online users use both query parameters and assessment parameters. Users query for answers satisfying some constraints. For instance, in a travel reservation context, a user may look for flights between an origin city and a destination city. In other contexts, a user may search for documents containing some keywords. They look for documents with a given subject matter. They query on the belief that such documents necessarily contain certain keywords. These are query parameters. Users also assess available alternatives for answers that best satisfy their needs. For example a traveller may ultimately select the cheapest direct flight to be on time at a meeting while not being too much in advance. Alternatively, if there is no direct flight, she may select a solution with the fewest connections. A document searcher may assess results knowing that relevant documents are likely to include some other words but that some relevant documents may not include any of those other words. These are assessment parameters.

The distinction between query parameters and assessment parameters is useful. The time for processing a query primarily depends on the query and not on the number of answers. Narrow requests including both query and assessment parameters usually return results that do not include many answers of interest. A wide request returns most answers of interest but also many irrelevant answers. Manually checking numerous answers is a time-consuming and error-prone process.

To facilitate answer assessment, it is known to further filter and sort data. In filtering, a user is shown only answers matching filtering criteria. In sorting, a user is shown answers sorted or ranked by sort parameters.

Prior filtering and sorting interfaces, especially for travel itineraries, have been constrained and sequential. That is, users are presented only limited filtering options and may be forced to re-submit queries. This leads to poor and inconsistent use of assessment parameters.

SUMMARY

An object of the invention is to overcome drawbacks of the prior art.

A further object of the invention is to provide an improved user interface for assessing travel itineraries.

A further object of the invention is to provide a user interface through which each of a large number of users may optimize their respective assessment of travel itineraries using a combination of assessment parameters selected from a large number of potential parameters.

A further object of the invention is to provide a user interface through which a user may assess travel itineraries using a combination of assessment parameters, including but not limited to criteria calculated from data fields of the query results and corporate travel, managed travel, and other biasing policies.

These and other objects are achieved by providing a user interface for a database query system having an answer window that displays query results. The user can structure the set of displayed answers by manipulating a selection table. A selection table is preferably a two-dimensional matrix. Each dimension of the matrix corresponds to a user-selectable assessment parameter. The selection table divides each parameter into a series of values, ranges or other sets. The user may change parameters for each dimension, such as by pick lists of parameters. The user may select any row or column of a selection table, and an answer table will display answers satisfying the value, range or other criterion of the selected row or column. The user may select any cell of a selection table, and an answer table will display answers satisfying the values, ranges or other criteria of the corresponding row and column.

By way of example, in the case of a query for travel itineraries, a database might return data about hundreds of itineraries between an origination city and a destination on a given set of dates. For each segment of a qualifying itinerary, the database returns additional information, such as departure time, price, etc. A user may choose, as a first parameter for the columns of a selection table, the time difference between a user's desired departure time and a flight's actual departure time. Then, columns of a selection table will correspond to differing ranges of time difference. The user also may chose, as a second parameter for rows of a selection table, a measure of whether an itinerary satisfies corporate travel, managed travel, or other biasing policies. Then, a first row of a selection table will correspond to itineraries that satisfy the policies, and a second row will correspond to itineraries that do not. By selecting a particular column of the selection table, the answer table will display itineraries having departure times that differ from the user's desired departure time by a selected amount. By selecting a particular row of the selection table, the answer table will display itineraries satisfying (or not satisfying) her corporate, managed travel, or other biasing policies. By selecting a particular cell of the selection table, the answer table will display itineraries satisfying both criteria of the associated row and column.

Parameters may be processed from fields of the underlying database. In the example above for the difference between a user's desired departure time and actual flight departure time, a database would not store such a value. The interface processes flight departure times and the user's input of a desired departure time to calculate the desired parameter. Parameters may also be inclusion sets (such as a list of airlines), exclusion sets (such as all airlines except a list of airlines), or a variety of other logical combinations. Managed travel policies may include a large number of factors. In this way, each user may organize the display of results according to her specific priorities.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein:

FIG. 3 illustrates a display window suitable for use as the second part of the display window of FIG. 1, including a selection table;

FIG. 9 illustrates specific examples of display windows used as the third and fourth parts of the display window of FIG. 1;

DETAILED DESCRIPTION OF EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The method and system described here provide an effective means for assessing data or offers of interest when large amounts of data or offers are available and when users are looking for compromises. For instance, an offer with all desirable features is relatively unlikely to be at the most affordable price. Conversely, the cheapest offer may not include all features that the user needs.

The method and system described here facilitate the known strategy of making a database query wide-enough to include most data or offers of interest and then filtering and sorting the results to locate the data or offers of most interest. The method and system described here departs from prior ones in providing a graphical and iterative way to select and apply multiple filters from among large numbers of potential filters. It also differs in allowing parameters derived from database fields, rather than merely filtering existing database fields. Other differences will become apparent from the discussion below.

A low fare search query is a query in which a customer provides a city pair, departure date, and return date. A low fare search returns itineraries for flights and possibly other modes of travel, such as rail, for which there are available seats for the city pair and dates. The number of answers may be very large, and answers differ in price, restrictions, and convenience (e.g., departure time, number of connections, etc.).

Figure 1:
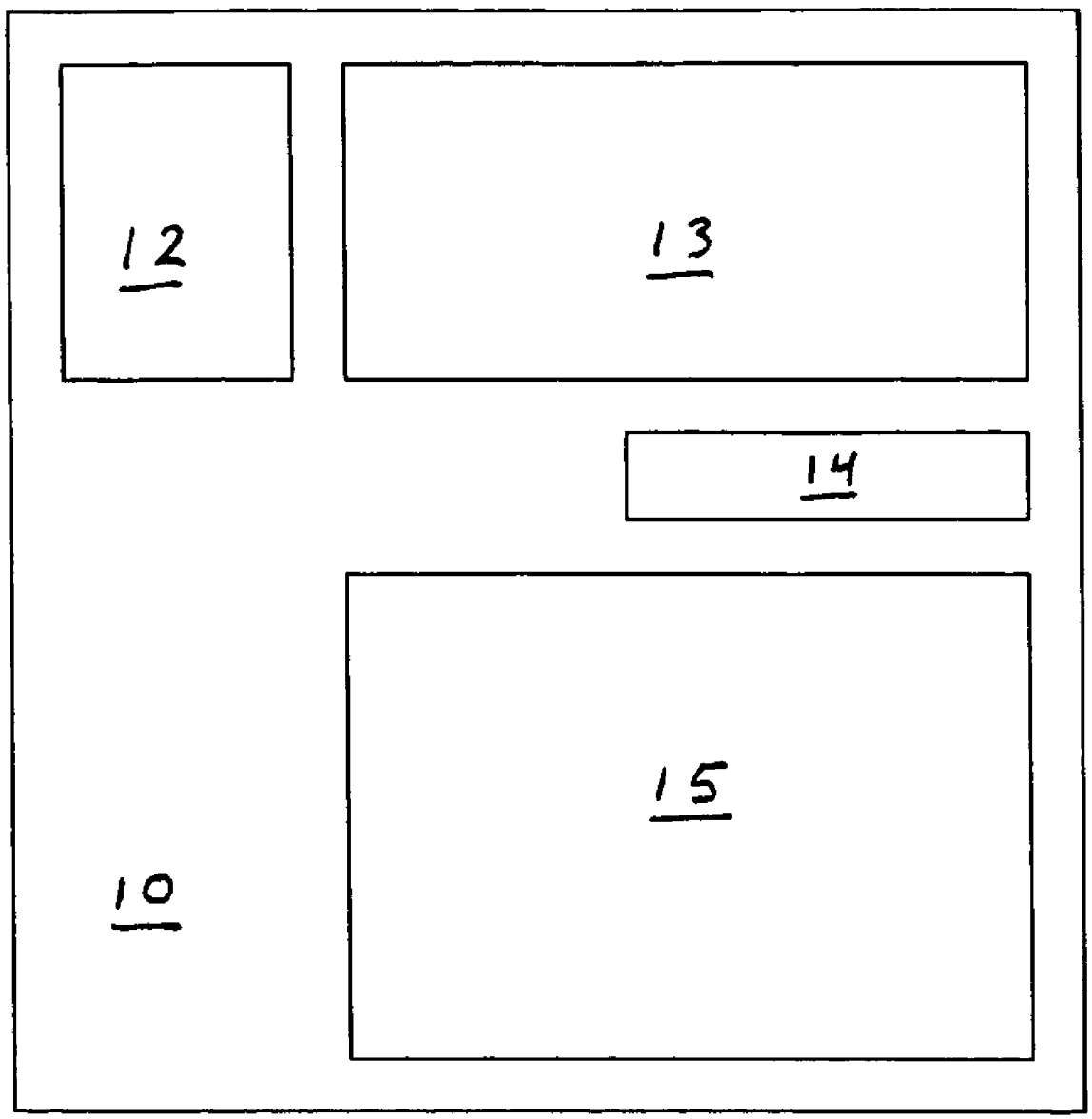
FIG. 1 illustrates a display window suitable for use with the novel system and method.

FIG. 1 illustrates a display window 10 suitable for use with the novel systems and methods discussed here. The exemplary window includes four parts. A first part 12 displays the terms of the user's query and reminds her of her query terms. The first part 12 may also allow the user to change her query. A second part 13 allows the user to narrow the set of results displayed in a fourth part 15. A third part 14 allows the user to select parameters to sort results displayed in the fourth part 15. These parts are discussed in more detail below.

It should be understood that the window 10 can have different layouts. Parts 1 and 3 are optional. Parts can be displayed one after another, rather than simultaneously, such as when the screen size does not allow comfortably displaying all parts on the same window. Preferably the order is: Part 1, Part 2, Part 3 and Part 4.

Figure 2:
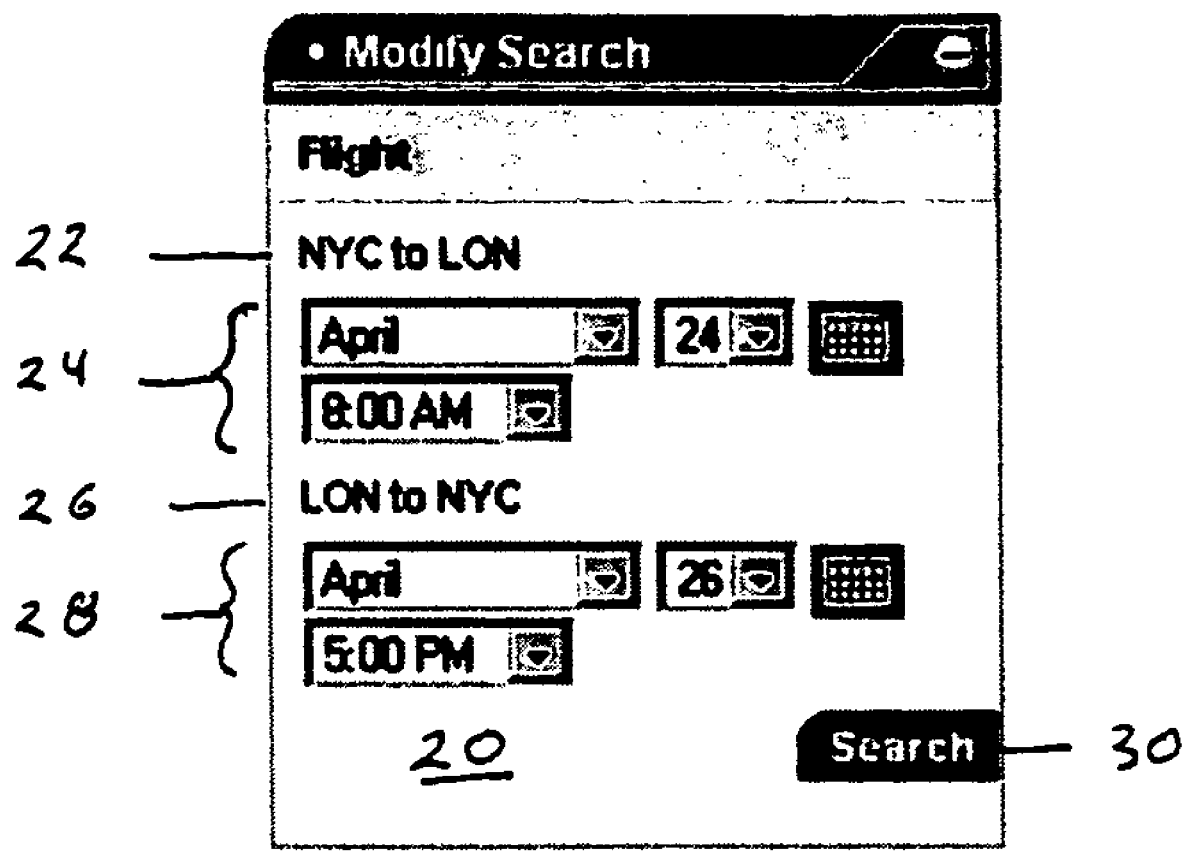
FIG. 2 illustrates a display window suitable for use as the first part of the display window of FIG. 1.

FIG. 2 illustrates a display window 20 suitable for use as the first part 12 of the display window 10 of FIG. 1. The first part 20 displays query parameters. In FIG. 2, query parameters include: outbound origination and destination cities 22; outbound travel date and time 24; return origination and destination cities 26; and return travel date and time 28. In the illustrated example, the user is searching for round trip flights between New York, USA and London, GB. As illustrated, the displays also include fields to allow a user to change her query parameters, and a "Search" button 30 to submit a revised query.

Figure 3:
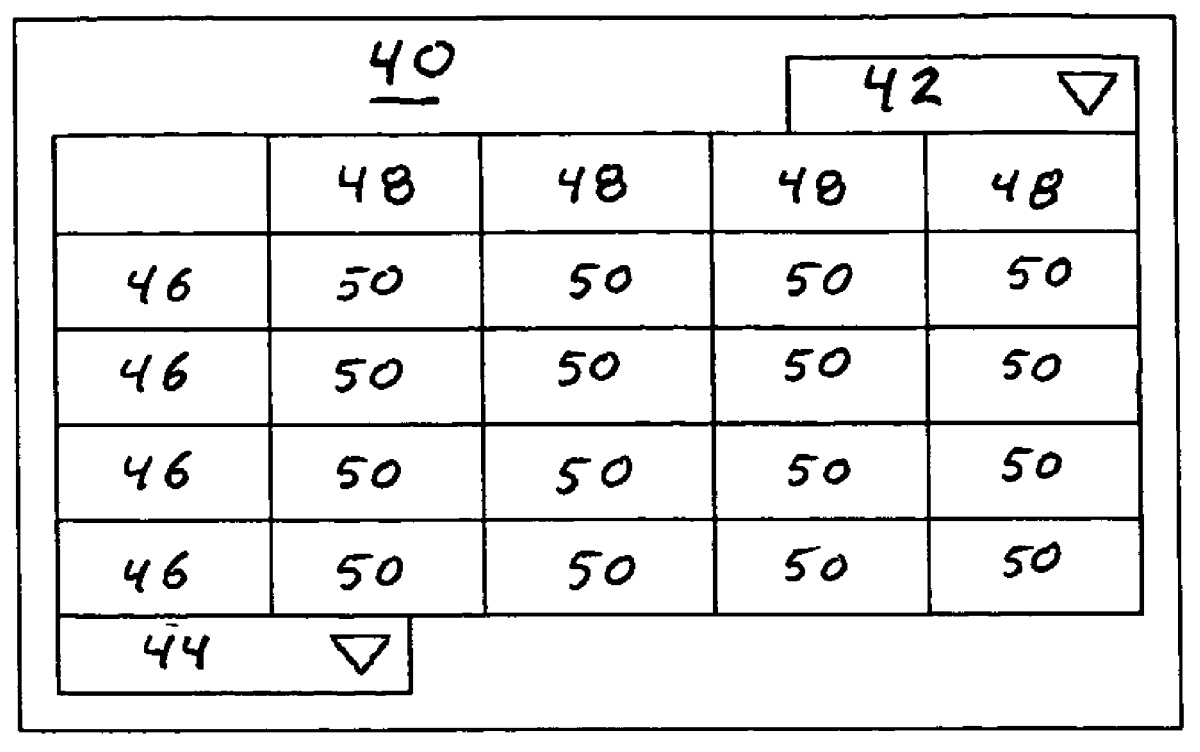

FIG. 3 illustrates a display window 40 suitable for use as the second part 13 of the display window 10 of FIG. 1. The second part 40 includes: a first dimension selector 42; a second dimension selector 44; column selectors 46; row selectors 48; and cell selectors 50. A table generally as the one shown in FIG. 3 will be referred to as a "selection table;" however, such a label is merely for convenience in associating written description with drawings and not for purposes of definition. For example, as discussed further, many aspects of a selection table may change with user input and query search results, and the illustrative examples shown here are not meant to be limiting. Exact positions of selectors may vary.

Figure 4:
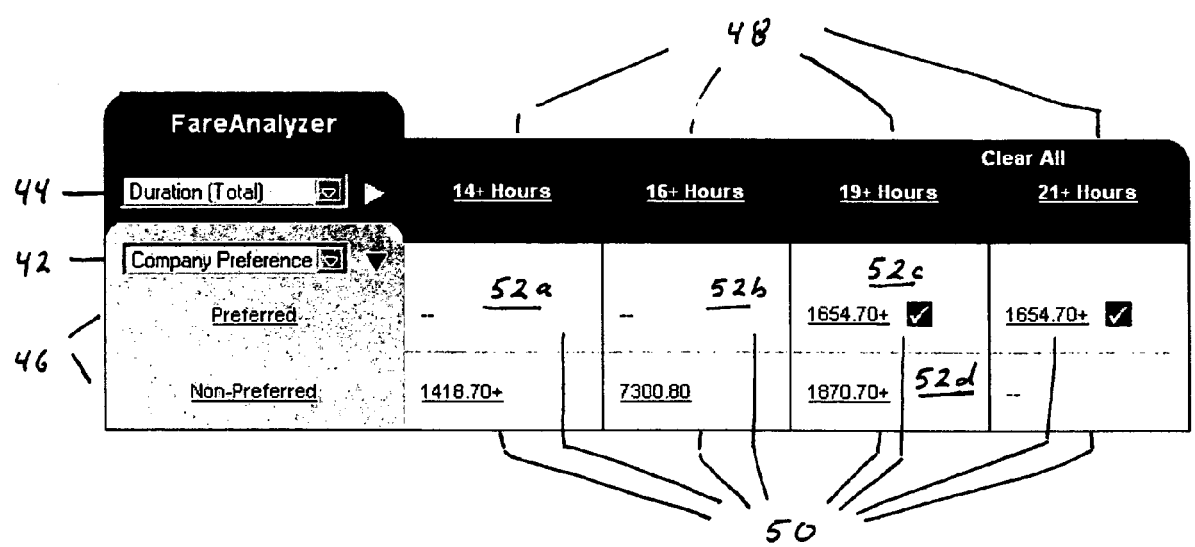
FIG. 4 illustrates a specific example of a display window used as a selection table of the second part of the display window of FIG. 1.

FIG. 4 illustrates a specific example of a selection table. A first dimension selector 42 is implemented as a first pick list. A second dimension selector 44 is implemented as a second pick list. This particular example shows two row selectors 46, one labelled "Preferred" and the other labelled "Non-Preferred." Here, "Preferred" and "Non-Preferred" refer to a characteristic of whether an itinerary satisfies a company's travel policies. This particular example also shows four column selectors 48 labelled respectively: "14+ Hours;" "16+ Hours;" "19+ Hours;" and "21+ Hours." This example also shows eight cell selectors 50. Cell selectors 50 are labelled with indicia of prices for itineraries meeting the qualifications of their respective rows and columns. For example, two cells 52a, 52b are labelled simply with dashes "--" signifying no itineraries met the conditions for "preferred" flights with total duration between 14 and 19 hours. Another cell selector 52c is labelled with a price "1654.70+" signifying that preferred itineraries with total durations between 19 and 21 hours were available for prices starting at US$1,654.70. Another cell selector 52d is labelled with a single price "7300.80" (no plus "+") signifying that all corresponding itineraries have that price. A user may position a cursor over any row, column or cell selector ("mouse over"), and a text message will appear in the display indicating the number of itineraries in the corresponding answer set. It should be understood that results of queries may change depending on seat availability, and these examples are provided purely to facilitate description of the novel methods and systems.

A column in a selection table can represent a value, a range of values, an inclusion list, an exclusion list, a test result, or other condition as appropriate for the selected parameter. Similarly, a row in a selection table can represent a value, range of values, inclusion list, exclusion list, test result, or other condition as appropriate for the selected parameter. Column selectors and row selectors 46 preferably are represented with buttons or hyperlinks labelled with the corresponding values, ranges, sets, tests or other conditions as appropriate. A user may select a column selector 48 or row selector 46, and a subset of answers corresponding to the condition of the selected column or row will be displayed in an answer table 15 (FIG. 1) (discussed further below).

A cell in a selection table represents a test for results satisfying the values, ranges of values, inclusion lists, exclusion lists, tests, or other conditions of both the corresponding row and column, as appropriate. A cell selector is preferably represented with a button or hyperlink. Cell selectors can be labelled with information of interest to the user about the corresponding set of itineraries. For example, a cell selector may be labelled with a price or price range. It also may be labelled with in indication whether results include an itinerary satisfying corporate, managed travel or other biasing policies. A user can separately refer to the corresponding column selector and row selector for information about the corresponding parameters. A user may select a cell selector, and a subset of answers meeting the conditions of both the corresponding row and column will be displayed in an answer table 15 (FIG. 1).

For the selection table of FIG. 4, a user may select the column labelled "19+ Hours" by clicking on its associated column selector, and all itineraries having duration times between 19 and 21 hours will be displayed in an answer table. Similarly, a user may select the row labelled "Preferred" by clicking on its associated column selector, and all itineraries satisfying the company's travel policies will be displayed in an answer table. Also by way of example, a user may select the cell 52c labelled "1654.70+." An answer table will then display itineraries that both (a) have duration times between 19 and 21 hours, and (b) satisfy the company's travel policies. Answer tables are discussed more fully below.

Figure 5:
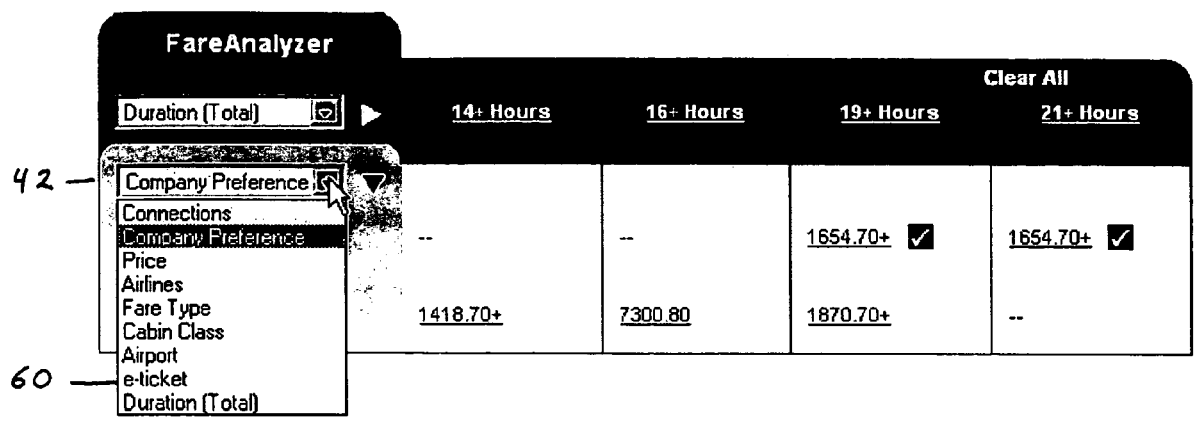
FIG. 5 illustrates a process for changing parameters of row selectors of a selection table.

FIG. 5 illustrates a process for assigning a user-selectable parameter to a dimension of a selection table. As illustrated, a user has clicked on a button of the first dimension selector 42 to reveal a first pick list 60. The first pick list 60 displays a number of parameters available for the user to assign to the row selectors. User-selectable parameters shown in the figure include: number of connections, satisfaction of company preference, price, airline identity, fare type, cabin class, airport, e-Ticket availability, and total travel duration. Other parameters may be provided, including but not limited to: refundability; outbound or return trip duration; difference from outbound trip requested time; difference from return trip requested time; difference from requested time (total); outbound trip departure time; and return trip departure time.

Figure 6:
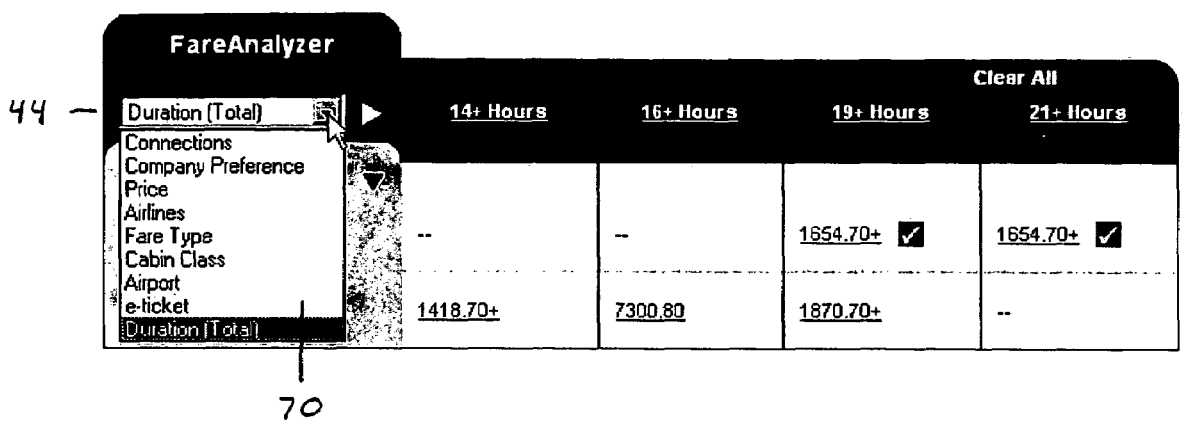
FIG. 6 illustrates a process for changing parameters of column selectors of a selection table.

FIG. 6 illustrates a process for changing parameters of column selectors of a selection table. As illustrated, a user has clicked on a button of the second dimension selector 44 to reveal a second pick list 70. The second pick list 70 displays a number of parameters available for the user to assign to the column selectors.

When the user picks a parameter of the first pick list, the meaning and function of the row selectors will change. A row selector label will be updated as appropriate for the newly-selected parameter, and the corresponding set of results will change. Similar to row selectors, when the user picks a parameter of the second pick list, the meaning and function of the column selectors will change. Furthermore, the meaning and function of cell selectors changes as appropriate when the user changes parameters assigned to row and column selectors.

It should be understood that specific parameters are illustrated here, but the functionality of the pick lists, row selectors, column selectors, cell selectors, and displays of subsets of results in an answer table apply commensurately for any parameter selected by the user for any dimension of a selection table.

Figure 7:
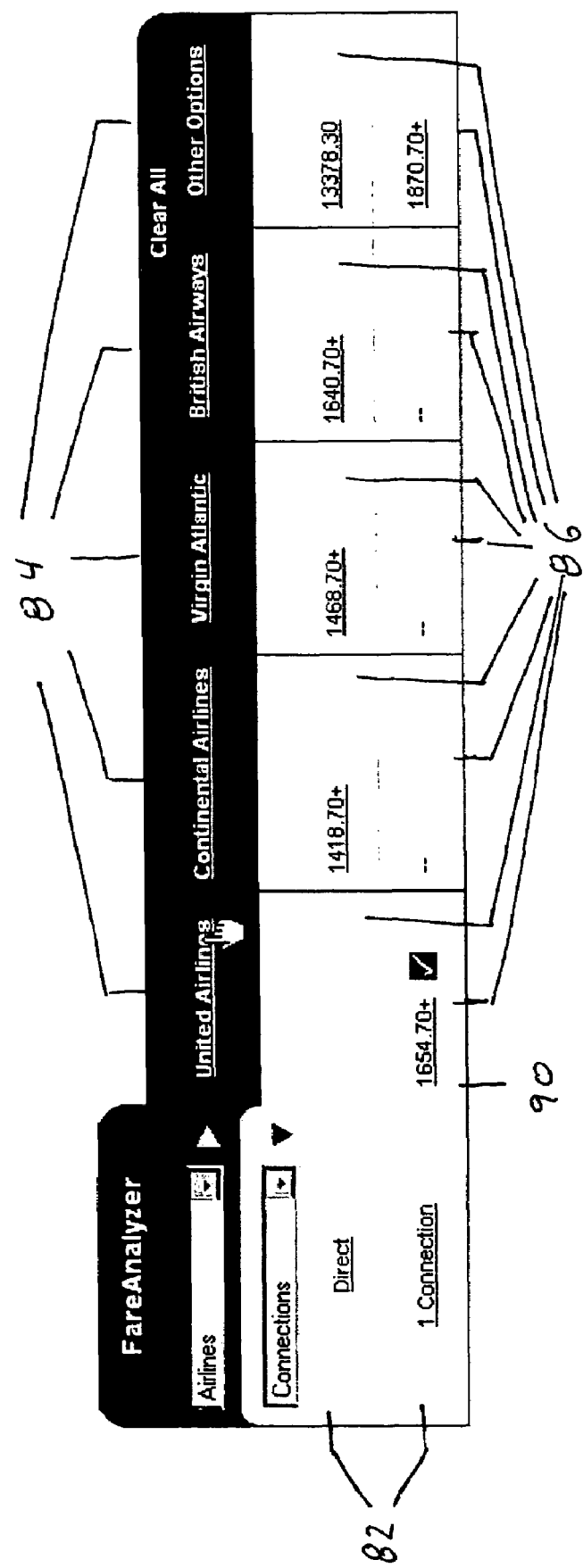
FIG. 7 illustrates a selection table after changing the parameter of the first dimension to the number of connections and after changing the parameter of the second dimension to airline identity.

FIG. 7 illustrates a selection table after changing the parameter of the first dimension to number of connections and after changing the parameter of the second dimension to airline identity. Labels of the row selectors 82 have changed to "Direct" and "1 Connection." The number of columns has increased from four to five, and labels of the column selectors 84 have changed to "United Airlines;" "Continental Airlines;" "Virgin Atlantic;" "British Airways;" and "Other Options." The number of cell selectors has increased from eight to ten, and labels of the cell selectors 86 have changed. Because the row and column dimensions have changed, the composition of corresponding itineraries also change, as reflected in the prices of the cell selector labels. A check mark in the label for cell selector 90 indicates that there is at least one itinerary that satisfies corporate, managed travel, or other bias policies. The check mark can appear in the label for any cell for which there are qualifying itineraries.

After selecting a new dimension for a selection table, a user may again select a row selector, column selector, or cell selector of the updated selection table, and an updated set of search results will be displayed in an answer window. In this way, a user can iteratively view results and update the dimensions of selection table according to the nature of the search results and the user's assessment needs.

A user may save her specific choice of parameters for selection table dimensions as a default for future queries. Her default selection is then saved in a user profile or by other known storage means. Alternately, default selection table parameters may be set by a corporate or other travel organization administrator.

Figure 8:
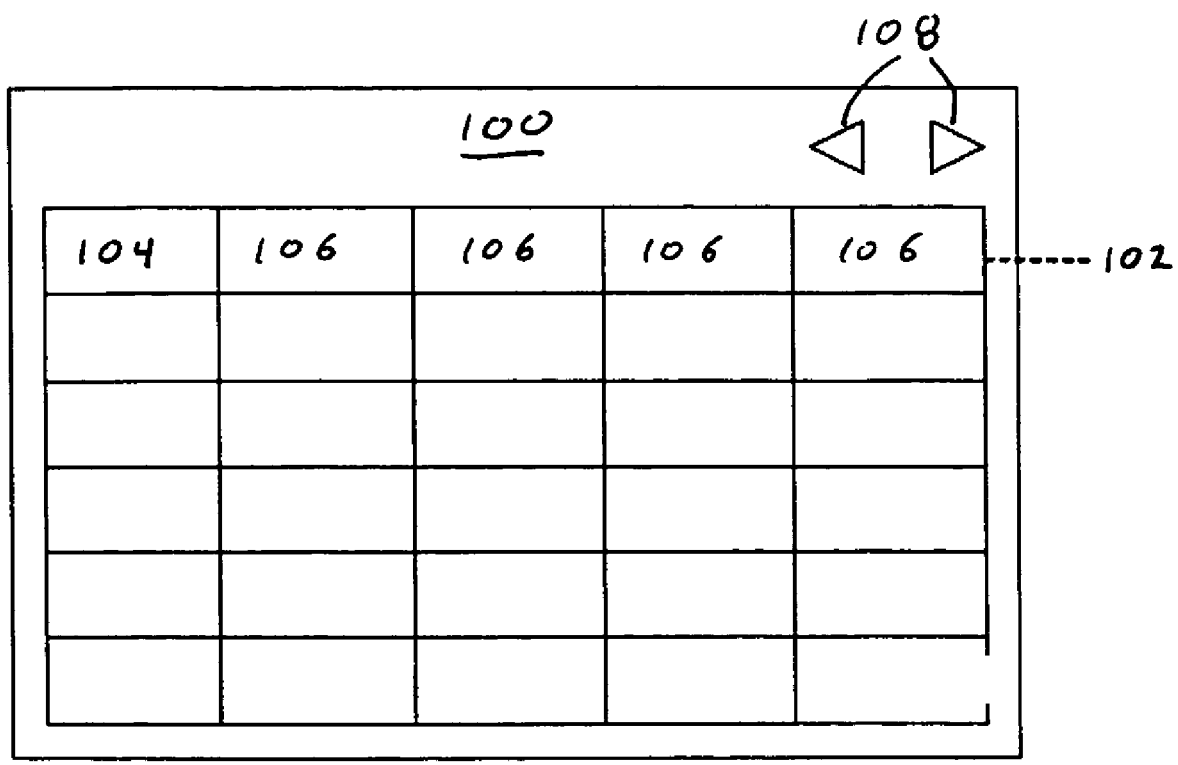
FIG. 8 illustrates a display window suitable for use as the fourth part of the display window of FIG. 1, including an answer window.

FIG. 8 depicts an example of an answer table 100 displaying a selected subset of the answer set. Each answer is represented by a row 102 comprising an answer selector 104 and fields 106. An answer table may contain separate rows for each connecting flight. In this example, all itineraries are air segments. It should be understood that answer sets may include rail or other transportation modes. Links may also be provided to display additional data about flights or itineraries. Each row of an answer table has the same number of fields, and each field has the same type and meaning for every answer. If the number of answers is too large to fit on one page, answers can be split among multiple pages available through a "next" selection, scroll, or other mechanism. Twenty answers may be displayed on page by scrolling, and navigation selectors 108 allow for moving to a previous or next answer page. A navigation selector can be implemented with buttons as depicted on FIG. 8 or with hyperlinks.

An answer table may also provide a link to additional information, such as by hyperlink. An answer table may include or link to fields containing the content of any data field of an answer as received from a database or anything that can be calculated or deduced from the database field results. For example, displayed or linked data may contain the departure date and arrival times as well as flight duration computed from arrival and departure. Common examples of data types are alphanumeric strings, integers, floating point numbers, Boolean results, and time. Even when an answer field is the direct display of a database field, some processing may be desirable to make the field understandable. For instance, time may be expressed in databases records in the format of (milli) seconds since Jan. 1, 1970. In such case, processing can translate this format into a Julian calendar date and time in hour/minute format. Database records also may include codes, such as airline identity, that may be translated into a more understandable words, phrases, or symbols using a reference table. A company logo may be obtained from a logo directory that contains image files of airline logos.

An answer selector 104 allows selecting answers in which a field, calculated or deduced if needed from the content of the actual answer, has the same value. The answer selector 104 can be labelled with the field content. An answer selector is preferably represented with a button or hyperlink. When the user uses an answer selector, the displayed subset of the answer set is updated.

Implementations of an answer table preferably provide a sort selector, typically a dropdown list allowing changing the sort parameter. Answers can be sorted by the content of a field of a tabular answer or by anything that can be calculated or deduced, such as screen scraping from the content of at least one field from the answer. It is possible to determine whether an integer equals, is lower than or is greater than another integer. It is further possible to compare the results of calculations performed on answers fields. Sort lists allow defining the order in which answers are displayed. For instance if a field or result of answers has four values, A, B, C and D, the sort list may define that answers must be displayed in the C, B, A, D order. If the current selection only contains answers in which a field has a given value, then the field can be removed from the list of sort orders. The following sort orders may be provided: price; company preference; vendor; departure time; arrival time; number of connections; cabin class; trip duration, or others.

Answers of the displayed subset of an answer set are sorted by an initial sort order. The initial sort order can be determined from different sources, including: (a) the setting of the site to which the user interface is connected; (b) the user profile when users are identified; (c) the community profile when the users belong to a community; or (d) an inference from the last request, that could be the query, a row selection, a column selection or a cell selection in the selection table or a Field Selection. For instance, when a row or a column selection is made in a selection table for which an answer field or the result of a calculation performed on an answer field equals the selector label, answers can be sorted by an order different from the field or result but that fits with the selection. If the user made a convenience selection (e.g., departure time or number of connections), then the system may choose a price sort. On the other hand, when a row or a column selection selects answers for which an answer field or the result of a calculation performed on an answer field is within a range of requested values, answers can be sorted by the field or result order. A cell selection in a selection table is a selection in two dimensions, suggesting two sort axes. Dimensions can be given a priority that can simply be their order in the predefined dimension list. Then, the dimension having the highest priority can be chosen, and the sort order can be determined as in case of a row or column selection.

FIG. 9 illustrates specific examples of display windows used as the third and fourth parts 14, 15 of the display window 10 of FIG. 1. The third part 120 includes a pick list 121 and a text message describing the answers being displayed and the total number of selected answers. The total number of selected answers will vary according to the users selection of a row, column, or cell selector of a selection table. It also may display other helpful information, such as a legend 123 indicating a meaning for a preference symbol.

The fourth part 122 includes an answer table displaying a number of rows for flights of an itinerary. The specific example shows two itineraries. The first is a round trip on Continental Airlines flights 8238 and 8237. The second is a round trip on Continental Airlines flights 8238 and 8221. Each row includes fields of data for each flight. In this example, each row contains the following fields: city pair(s); airline name(s) and flight number(s); number of connections; departure date and time; fare class; features (e-ticket); and flight duration.

In the example of FIG. 9, four answer selectors are shown, one for each outbound flight and one for each return flight, implemented with hyperlinks labelled "Show options with this flight." When the user clicks on an answer selector, answers that contain the selected flight are selected, and corresponding rows of the answers are shaded. Answers that do not contain the selected flight are removed from the answer window. The example of FIG. 9 additionally includes a button for each itinerary labelled with the itinerary price. Clicking this button selects answers of that price.

The Example of FIG. 9 also includes a button for each itinerary labelled "View Details." Clicking this button retrieves a page of additional information about the selected itinerary. The example of FIG. 9 further includes a button for each itinerary labelled "Purchase conditions." Clicking this button retrieves a page of additional information about ticket restrictions, refunds, etc. Each itinerary of the example of FIG. 9 includes a button labelled "Select." Clicking this button selects the itinerary for purchase and sends the user to a page leading to booking and fulfilment.

In overall operation, each user performs a query using part 1 of the window of FIG. 1. The user then is presented with a selection table with default parameters. The user may select different parameters for dimensions of the selection table according to her particular needs. The selection table then updates column selectors, row selectors, and cell selectors with appropriate values, ranges, sets or other conditions. Columns, rows, and cells of the selection table represent differing answer sub-sets. The user then selects a column selector, row selector, or cell selector to be presented with the corresponding answer set in an answer window. The user may iterate, assign different parameters to selection table dimensions, and view new answer sets.

Figure 10:
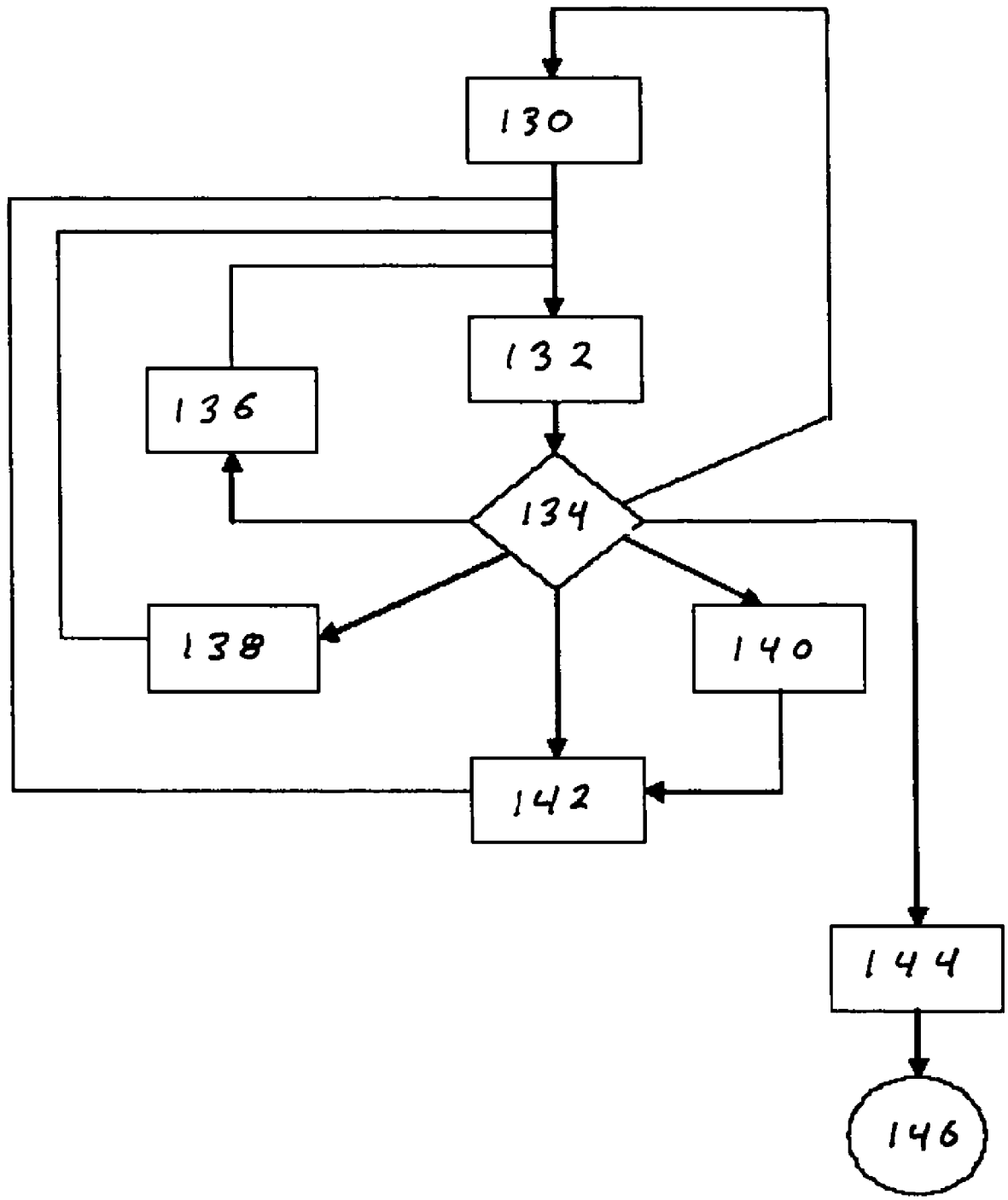
FIG. 10 depicts processes for using the interface illustrated in prior figures.

FIG. 10 depicts processes for using the interface illustrated in prior figures. The process enables each user to identify answers of interest using her own assessment strategy. The general process flow is as follows.

1. The user makes a query 130.
2. The user checks the answer list 132.
3. The user makes a decision 134.
4. If she feels happy with an answer, she selects the answer 144 and moves to the next step 146 that can be, for instance, displaying the whole document or booking the corresponding product.
5. If she finds that relevant answers should have the value of an answer selector, she selects the answer selector 136 and moves back to step 2.
6. If she finds that another sort order can reveal relevant answers, she changes the sort order 138 and moves back to step 2.
7. She can also select another cell, column or row 142 of the selection table and move back to step 2.
8. She can also modify the selection table dimensions 140, select a cell, column or row 142 and move back to step 2.

Several characteristics should now be apparent about the selection table and its relationships to the answer table and to the user. First, the ability of a user to assign different parameters to any dimension of a selection table allows each user to implement an assessment strategy according to her particular needs. Second, the ability of a user to re-assign different parameters to any dimensions of a selection table allows the user to modify her assessment strategy easily and iteratively after viewing an answer sub-set. Third, use of assessment parameters that are calculated from fields of raw data returned from the database (as compared to merely sorting on existing database fields) allows the interface to be adapted for a wide variety of users according to their differing needs. Fourth, inclusion of corporate, managed travel, or other bias policies policy metrics as a selectable parameter and as a displayed indicator makes the interface especially useful for corporate and other travel organizations.

It also should now be understood that parameters that can be assigned to a selection table dimension are used to select subsets of the query results, and some may be used to sort the selected subsets. It is possible to select an answer set using two parameters by assigning those parameters to dimensions of a selection table, selecting a cell selector, and then sort by another available parameter. Assignable parameters may be the same as a pre-existing database field. For example, the database may have a field for cabin class (economy/business/first), and cabin class may be a parameter that a user can select for a dimension of a selection table. Preferably, assignable parameters include additional ones derived from, but different than, pre-existing database fields. For example, a user might prefer to assess the relative difference between a flight's departure time and a user's desired departure time, rather than merely evaluate a flight's absolute departure time. Furthermore, a user might prefer to assess a parameter calculated from a set of fields. For example, total trip duration for a multi-segment itinerary may be calculated from the departure time of the first flight segment and the arrival time of the last flight segment.

The numbers of rows, columns, and cells of a selection table may vary according to user selections and those numbers in turn affect the sizes of the answer sets. The number of rows or columns will depend on the particular parameters selected. Some parameters are binary values or have only a small number of discrete values, e.g., fewer than seven values. Then, the number of rows or columns can equal the number of available values. Availability of an e-ticket, for example, is a binary value. Assignment of that parameter to a selection table results in two rows or columns. The number of connections can be implemented with three values and hence three rows or columns: direct flights, one connection, and two connections. Travellers rarely choose itineraries with more than two connections.

In other cases, a parameter may have many discrete values or an essentially continuous range of values. Then, the number of rows or columns should be limited to a practical number for display and human factor purposes, such as fewer than seven. Each row or column would represent a range of values. Price, for example, can vary from less than US$100 to over US$10,000. Range boundaries may be selected by a linear or exponential algorithm over the range of expected or actual query results. Alternately, range boundaries may be selected according to clustering of query results so that each row or column groups similar results. A variety of such algorithms are known based on histograms or other statistical analysis. Range selection keeps the number of possible choices at a level compatible with constraints, such as the screen size and human factors. A human can only discriminate among the a limited set of choices, the optimum probably being between three and seven.

Range selection works for data for which greater-than and less-than operators are semantically meaningful. In other cases, parameters may have values that are elements of a set of possible answers (referred to here as an inclusion set), or values that are not part of a set (referred to here as an exclusion set). Country codes illustrate this issue. It is possible to sort country codes by alphabetic order, but ranges of country codes based on alphabetic order are useless for most applications. For instance countries whose country code starts with U, Ukraine (Europe), Uganda (Africa), United Kingdom (Europe), United States (North America), Uruguay (South America) and Uzbekistan (Asia) have little in common except that their names start with the same letter. It is better to define an inclusion or exclusion list of countries by region.

Parameters may combine inclusion and exclusion lists with exact-match conditions. Frequently, the field or result of most answers have few values, for instance A, B, C, D though the field or result may have many other values. In such case, the system will preferably provide the selection of A, B, C and D answers and the selection of answers whose field or result is neither A, nor B, nor C, nor D. As illustrated in FIG. 7, the airline parameter is an example of combination of at least two criteria: (1) comparison for equality (if the user clicks on the links of the "British Airways" column only answers in which the airline is British Airways are selected); and (2) exclusion list. If the user clicks on the links of the "Other Option" column, answers in which the airline is neither British Airways nor American Airlines are selected.

Complex parameters may also be used as dimensions of a selection table, such as whether an itinerary is "preferred" under corporate, managed travel, or other bias policies. Travel management biasing is known, and parameters may be calculated in accordance with many factors, such as: trip type/purpose of travel; airport/city/state/region of travel; dates of booking; dates of travel; trip direction; vendors/airlines; airfare max price; airfare based on a threshold of prices returned; fare restrictions, etc. Specific algorithms may be established by different corporate or other travel organizations.

Generally, parameters may be defined to select and sort answers in up to three ways:
1. selection of answers for which a field of the answers or the result of a calculation performed on at least one field of the answers equals a requested value;
2. selection of answers for which a field of the answers or the result of a calculation performed on at least one field of the answers is within a range of requested values or belongs to an inclusion list of values or does not belong to an exclusion list of values or satisfies a test; and
3. sort of answers in ascending or descending value or according to a sort list of a field of the answers or of the result of a calculation performed on at least one field of the answers.

For instance a test may compare two fields a and b, and the selected answers can be the answers whose field a equals field b.

String data allows several calculations. For instance, it is possible to count the number of occurrences of a given word or set of words in a string and then to compare the number of occurrences found in a field of a first answer with the number of occurrences found in the same field of a second answer. Known techniques such as screen scraping and wrappers allow extracting data from structured text answers. Answers allowing comparisons may include any answer allowing calculations and parsing, and notably textual answers.

Figure 11:
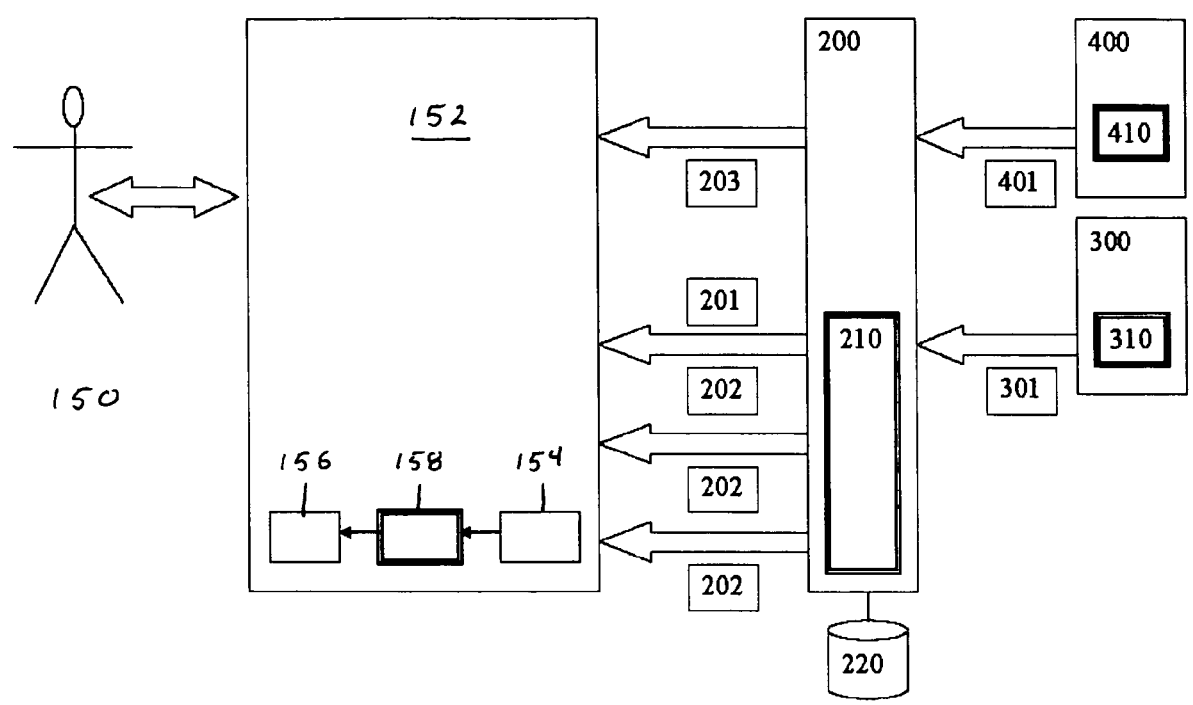
FIG. 11 illustrates a system suitable for implementing the methods illustrated in prior figures.

FIG. 11 illustrates a system suitable for implementing the methods illustrated in prior figures. A user 150 uses a web browser 152 to communicate with a web server environment 200, which in turn communicates with a profile server 400 and a back-end database server 300. The Web browser 152 may be, for example, Internet Explorer from Microsoft, Firefox from the Mozilla foundation, Netscape from Netscape Communications Corp, or Safari from Apple Computer Inc. The user makes a query using a query form 203 returned by a Web server environment 200 capable of efficiently processing static and dynamic requests. The environment can be, for instance, Internet Information Services (IIS) from Microsoft, or Apache from the Apache Software Foundation with a server plug-in such as PHP from the PHP group. Alternately, the environment can be a combination of a Web server, such as the aforementioned IIS and Apache, and a J2EE application server such as Tomcat from the Apache Software Foundation or BEA Weblogic. Other environments can be used.

When the user enters data to the query form 203 and clicks on the Search button, the browser 152 sends an HTTP request to the Web server 200. A server program 210 processes the HTTP request. The server program 210 may be written, for example, in Java from Sun Microsystems, in C#/.NET from Microsoft, or in PHP from the PHP group, depending on the Web server environment.

If the user 90 is authenticated or registered, the server program 210 retrieves a user profile 401 from a local database 202 or from a profile server 400 hosting a profile program 410. The profile can contain initial dimension and sort preferences. The user 150 may belong to a community for which initial dimension and sort settings have been defined. The Web server 200 implements one or more web sites and, for each of the sites defines, initial dimension and sort settings. The server program 210 determines initial dimension and sort settings from the user profile, community, and site.

Server program 210 parses the HTTP request and sends a low fare search query to one or more backend program 310 running on a backend server 300 that returns a set 301 of answers. A backend server may be part of a centralized reservation system or global distribution system, such as the Amadeus system. Several sources may be queried, though only one is shown. The server program 210 receives an answer set from a backend server 300 and translates it into a format 202 such as XML suitable for processing in a browser environment. The server program 210 may combine answer sets from differing sources. The server program 210 also retrieves reference data from a database 220, such as range setting and exclusion, inclusion and sort lists. The server program 210 generates an answer page 201 and returns the page to the browser. The page may contain scripts and references to images, scripts and other static objects hosted by the Web server 200.

The browser runs the scripts 158 when the page is loaded and when the user clicks on a dimension dropdown lists column selector, row selector or cell selector, sort dropdown list, or field link. The scripts build a memory image 154 of the answer set using a technology such as the Document Object Model (DOM) standardized by the World Wide Web Consortium (W3C). The scripts use the memory image to dynamically update the displayed subset of the answer set 156.

Low fare answer sets are large, and low fare data come from different sources (published fares, Web fares, etc.). Therefore, the server program 210 preferably returns the page 201 along with the first answers 202 to the user. Then, the scripts 158 poll the server program 210 for next answers 202 and update the user page accordingly. To implement the function, the scripts 158 can use the Asynchronous JavaScript Technology and XML (AJAX).

The scripts 158 could be replaced by a browser-based program such as a Java applet as defined by Sun Microsystems or an ActiveX component as defined by Microsoft.

Figure 12:
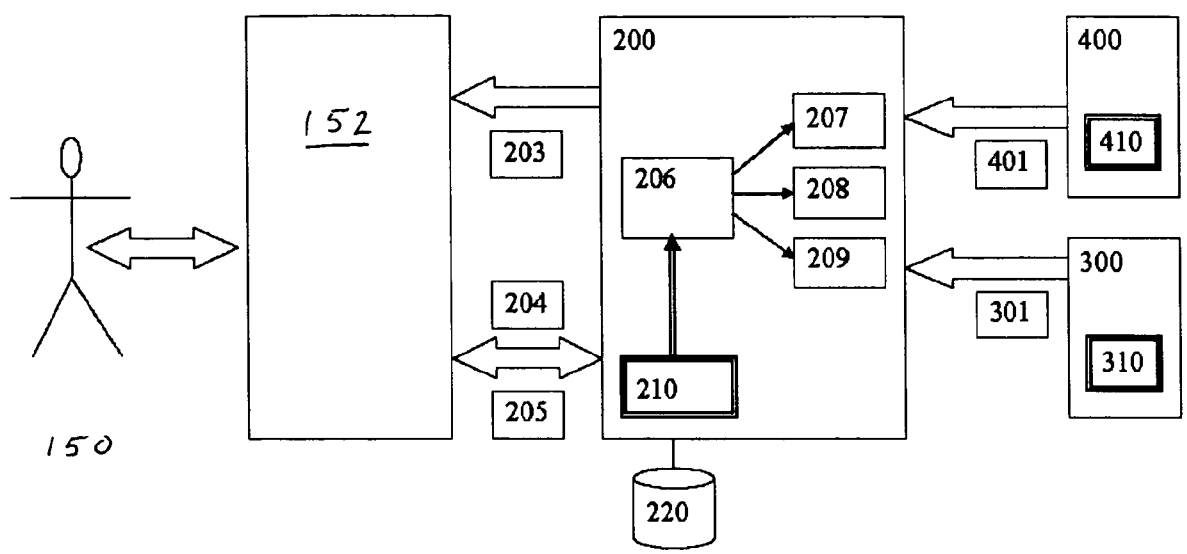
FIG. 12 illustrates an alternate system suitable for implementing the methods illustrated in prior figures.

FIG. 12 illustrates an alternate implementation suitable for the methods illustrated above. The user 150 uses a low fare query form 203 displayed by a browser 152. The browser 152 may be a Web browser such as Internet Explorer from Microsoft, Firefox from the Mozilla foundation, Netscape from Netscape Communications Corp, or Safari from Apple Computer Inc.

When the user enters data to the query form 203 and clicks on the Search button, the browser 152 sends an HTTP request to a Web server environment 200 capable of efficiently processing static and dynamic requests. The environment can be, for instance, Internet Information Services (IIS) from Microsoft, or Apache from the Apache Software Foundation with a server plug-in such as PHP from the PHP group. Alternately, the environment may be a combination of a Web server, such as the aforementioned IIS and Apache, and a J2EE application server such as Tomcat from the Apache Software Foundation or BEA Weblogic.

A server program 210 processes the HTTP request. The server program 210 can be written in Java from Sun Microsystems, C#/.NET from Microsoft, or PHP from the PHP group, depending on the Web server environment. The server program 210 maintains a session context 206 per browser session. The session is uniquely identified by a session identifier 204 that is stored in a cookie or carried in HTTP messages with URL rewriting.

If the user is authenticated or registered, the server program 210 retrieves a user profile 401 from a local database 220 or from a profile server 400 hosting a profile program 410. The profile can contain initial dimension and sort settings. The server program 210 keeps an in-memory image 207 of the user profile pointed by the session context.

The server program 210 parses the HTTP request 205 and sends a low fare search query to a backend program 310 running on a backend server 300 that returns a set of answers 301. The server program may query multiple sources and combine answer sets, even though only one source is shown. The server program 210 keeps an in-memory image 209 of the answer set. The server program 210 retrieves reference data, such as range setting and exclusion, inclusion and sort lists from a local database 220. The server program 210 also keeps an in-memory image of the reference data 208. The server program 210 generates an answer page 204 containing references to images and other static objects hosted by the Web server 200 and returns the page to the browser 152.

When the user 150 clicks on a dimension dropdown list, column, row or cell link, sort dropdown list, or field link, the browser 100 sends a new HTTP query 205 to the Web server environment 200. The server program 210 processes the query using the answer image 209 and the reference data image 208 pointed by the session context 206. Server program 210 generates a new page displaying the modified subset of the answer set and returns the page to the browser 152.

When the user makes a query, the system displays a selection table with initial dimension settings and the answer set or the first page of the answer set sorted in an initial sort order. The system may determine the initial dimension settings from: (a) the setting of the site to which the user interface is connected; (b) a community setting when the user belongs to a community; (c) the query parameters; (d) the query answer set; or (e) the user profile when a user registered and recorded a initial dimension setting in her profile in the past. It should be apparent to the person of the art that the description of the initial dimension setting also applies to the initial sort order.

It is known in the art for a travel interface to query multiple sites for air fare information. It should be apparent that the method and system described above may query multiple sources for air, rail, bus and other modes of transportation. Then, answer tables can display itineraries for differing travel modes. In addition, selector table parameters may include ones that select for individual modes of transportation, or otherwise process an indicator of mode.

The naming of parts above as a "selection table" or "answer table" is meant merely to provide a convenient label for different parts and not as a definition. Not all characteristics described for the exemplary embodiments are required.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for assisting a person in assessing results of a database query comprising:
   obtaining a set of results from an electronic database query;
   selecting a column parameter from a pre-existing list of column parameters;
   selecting a row parameter from a pre-existing list of row parameters, the selected row parameter and selected column parameter defining selected table parameters;
   creating a custom table based on the selected table parameters, a column of the custom table being populated with at least one column selector that defines a subset value of the selected column parameter, and a row of the custom table being populated with at least one row selector that defines a subset value of the selected row parameter;
   populating each open cell with at least a portion of the set of obtained results based on the corresponding combination of the column selector and row parameter corresponding for each open cell; and
   visually presenting the custom table as populated by said populating.

2. The method of claim 1, wherein when said at least a portion of the set of obtained results based on the corresponding combination of the column selector and row parameter corresponding to a particular open cell is zero, said populating comprises populating said particular open cell with an indication that no responsive information exists.

3. The method of claim 1, wherein said at least a portion of the set as populating into a particular open cell of a table is a link, said method further comprising selecting said link to obtain additional information from the set of obtained results from the corresponding combination of the column selector and row parameter.

4. The method of claim 1, further comprising, after the visually presenting:
   changing the table parameters by reselecting the column parameter and/or the selected row parameter;
   substituting the custom table with a revised custom table based on the changed table parameters;
   populating each open cell of the revised custom table with at least a portion of the set of obtained results consistent with the new table parameters; and
   visually presenting the revised custom table as populated.

5. The method of claim 1, wherein said visually presenting comprises:
   converting electronic data representations of the custom table as populated into a format displayable on a display screen; and
   displaying the custom table on the display screen.

6. The method of claim 1, further comprising:
   selecting a row selector of the custom table;
   creating a second table based on the selected a column parameter and a subset of secondary row selectors associated with the selected row selector;
   populating the second table with additional information from the set of obtain results; and
   visually presenting the second table as populated by said populating.

7. The method of claim 1, further comprising:
   selecting a column selector of the custom table;
   creating a second table based on the selected row parameter and a subset of secondary column selectors associated with the selected column selector;
   populating the second table with additional information from the set of obtained results; and
   visually presenting the second table as populated by said populating.

8. The method of claim 1, wherein the pre-existing list of column parameters includes at least one parameter that is different from parameters of the database query.

9. The method of claim 1, wherein the pre-existing list of row parameters includes at least one parameter that is different from parameters of the database query.

10. A method for assisting a person in assessing results of a database query comprising:
    obtaining a set of results from an electronic database query;
    selecting a column parameter from a pre-existing list of column parameters;
    identifying, from the selected column parameter and the set of obtained results, at least one column selector that defines a subset value of the selected column parameter;
    selecting a row parameter from a pre-existing list of row parameters, the selected row parameter and selected column parameter defining selected table parameters;
    identifying, from the selected row parameter and the set of obtained results, at least one row selector that defines a subset value of the selected row parameter;
    creating a custom table based on the selected table parameters, a column of the custom table being populated with the at least one column selector, and a row of the custom table being populated with the at least one row selector;
    populating the custom table with at least a portion of the set of obtained results based on, for open cells of the table, the results of the database query as it applies to the corresponding combination of the column selector and row parameter corresponding for each open cell; and
    visually presenting the custom table as populated by said populating.

11. The method of claim 10, wherein when said at least a portion of the set of obtained results based on the corresponding combination of the column selector and row parameter corresponding to a particular open cell is zero, said populating comprises populating said particular open cell with an indication that no responsive information exists.

12. The method of claim 10, wherein said at least a portion of the set as populating into a particular open cell of a table is a link, said method further comprising selecting said link to obtain additional information from the set of obtained results from the corresponding combination of the column selector and row parameter.

13. The method of claim 10, further comprising, after the visually presenting:
   changing the table parameters by reselecting the column parameter and/or the selected row parameter;
   substituting the custom table with a revised custom table based on the changed table parameters;
   populating each open cell of the revised custom table with at least a portion of the set of obtained results consistent with the new table parameters; and
   visually presenting the revised custom table as populated.

14. The method of claim 10, wherein said visually presenting comprises:
   converting electronic data representations of the custom table as populated into a format displayable on a display screen; and
   displaying the custom table on the display screen.

15. The method of claim 10, further comprising:
   selecting a row selector of the custom table;
   creating a second table based on the selected column parameter and a subset of secondary row selectors associated with the selected row selector;
   populating the second table with additional information from the set of obtained results; and
   visually presenting the second table as populated by said populating.

16. The method of claim 10, further comprising:
   selecting a column selector of the custom table;
   creating a second table based on the selected row parameter and a subset of secondary column selectors associated with the selected column selector;
   populating the second table with additional information from the set of obtained results; and
   visually presenting the second table as populated by said populating.

* * * * *